United States Patent [19]

Kim et al.

[11] Patent Number: 5,747,587
[45] Date of Patent: May 5, 1998

[54] HCFC RESISTANT RESIN COMPOSITION

[75] Inventors: Sung-kook Kim, Kyungki-do; Jin-whan Choi, Anyang, both of Rep. of Korea

[73] Assignee: Cheil Industries, Inc., Taegu, Rep. of Korea

[21] Appl. No.: 727,351

[22] Filed: Oct. 8, 1996

[30] Foreign Application Priority Data

Jul. 19, 1996 [KR] Rep. of Korea .................. 96-29089

[51] Int. Cl.$^6$ .................. C08F 279/04; C08L 55/02
[52] U.S. Cl. .................. 525/87; 525/71
[58] Field of Search .................. 525/71, 87

[56] References Cited

U.S. PATENT DOCUMENTS 5,229,457  7/1993  Kamoshita et al. .................. 525/71

FOREIGN PATENT DOCUMENTS

| | | |
|---|---|---|
| 1921112 | 11/1970 | Germany . |
| 2901576 | 7/1980 | Germany . |
| 0074051 | 3/1983 | Germany . |
| 0184244 | 10/1984 | Japan . |
| 2-284906 | 11/1990 | Japan . |
| 6-262713 | 9/1994 | Japan . |

*Primary Examiner*—Irina S. Zemel
*Attorney, Agent, or Firm*—Maria Parrish Tungol; John A. Parrish

[57] ABSTRACT

The resin composition for preparing an internal box of a refrigerator according to the present invention comprises (A) a graft polymer obtained by grafting of a monomer mixture comprising a vinyl cyanide compound and an aromatic vinyl compound to a conjugated diene rubber, (B) a graft polymer obtained by grafting a monomer mixture comprising a vinyl cyanide compound and an aromatic vinyl compound to an acrylic rubber, (C) a copolymer of about 40~about 50% by weight of a vinyl cyanide compound and about 60~about 50% by weight of an aromatic vinyl compound, and (D) a copolymer of about 30~about 35% by weight of a vinyl cyanide compound and about 70~about 65% by weight of an aromatic vinyl compound. The thermoplastic resin composition according to the present invention may be preferably employed in preparing the internal boxes of refrigerators, which are manufactured using HCFC 141b as a foaming agent, due to good physical properties, easy vacuum formability, and excellent freon resistance, especially excellent resistance to HCFC 141b.

14 Claims, No Drawings

HCFC RESISTANT RESIN COMPOSITION

FIELD OF THE INVENTION

The present invention relates to a thermoplastic resin composition for forming an internal box of a refrigerator. More particularly, the present invention relates to a thermoplastic resin composition which is capable of forming an internal box of a refrigerator having good physical properties, easy vacuum formability, and excellent freon resistance, especially excellent resistance to HCFC 141b.

BACKGROUND OF THE INVENTION

The housing of a refrigerator is manufactured by assembling an internal box and an external box wherein a space between the two boxes is filled with a rigid polyurethane foam. Usually the external box is made of a steel sheet, and the internal box is made of a sheet of resin materials by a vacuum forming process. The rigid polyurethane foam has a role of a thermal insulator, which is formed by injecting a liquid polyurethane and a foaming agent.

An ABS resin has been mainly employed for the internal box of a refrigerator. An ABS resin means a graft copolymer obtained by grafting a monomer mixture comprising from 10 to 40% by weight of a vinyl cyanide compound and from 90 to 60% by weight of an aromatic vinyl compound to a conjugated diene rubber. For commercial use, the ABS resin usually contains styrene-acrylonitrile (SAN) copolymers therein. The SAN copolymer is a polymer polymerizing from 10 to 40% by weight of a vinyl cyanide compound and from 90 to 60% by weight of an aromatic vinyl compound.

The ABS resin containing SAN copolymers has been used for preparing an internal box of a refrigerator, because the resin has a good balance of physical properties such as rigidity and impact resistance, easy vacuum formability, excellent glossy appearance, and excellent resistance to CFC 11 which is used as a foaming agent of polyurethane.

Because CFC 11 threatens destruction of the ozone layer in the stratosphere, CFC-11 is being replaced with HCFC 141b at the present time. However, HCFC 141b has a problem in that a stress crack appears on the internal box of a refrigerator by dissolving the resin component. There have been significant efforts and researches to solve the problem.

Japanese Patent Application Laid-Open No. 2-284906 discloses an internal box of a refrigerator formed with an ABS resin containing a high amount of a vinyl cyanide compound, and Japanese Patent Application Laid-Open No. 6-262713 discloses a styrenic resin composition comprising 100% by weight of a styrenic resin and 0.1~100% by weight of arcylic rubber.

U.S. Pat. No. 5,229,457 to Kamoshita et al. corresponding to Japanese Patent Application Laid-Open No. 4-170460 discloses a thermoplastic resin composition comprising a graft copolymer (A) obtained by polymerizing a monomer mixture consisting of a vinyl cyanide compound and an aromatic vinyl compound in the presence of an acrylic rubber, a graft copolymer (B) obtained by polymerizing a monomer mixture consisting of a vinyl cyanide compound and an aromatic vinyl compound in the presence of a conjugated diene rubber, and a copolymer (C) obtained by polymerizing a monomer mixture consisting of a vinyl cyanide compound and an aromatic vinyl compound.

The internal box according to Japanese Patent Application Laid-Open No. 2-284906 causes a yellow color phenomenon and a poor vacuum formability, although it is resistant to a freon material. The resin composition of Japanese Patent Application Laid-Open No. 6-262713 has a drawback in physical properties, that is, rapidly reducing impact strength by adding the acrylic rubber in the compounding process.

Also, the resin composition of U.S. Pat. No. 5,229,4D7 tends to occur a color change phenomenon during molding process due to a high content of a vinyl cyanide compound, and provides a relatively low impact strength due to a high content of an acrylic rubber and a higher glass transition temperature of an acrylic rubber than a conjugated diene rubber.

Accordingly, the present inventors have developed a thermoplastic resin composition which is capable of forming an internal box of a refrigerator having good physical properties, easy vacuum formability, and excellent freon resistance, especially excellent resistance to HCFC 141b.

OBJECTS OF THE INVENTION

An object of this invention is to provide a thermoplastic resin composition having a good balance of physical properties such as rigidity and impact resistance, and no color change phenomenon during a molding process.

Another object of the invention is to provide a thermoplastic resin composition which is highly resistant to HCFC 141b.

A further object of the invention is to provide a thermoplastic resin composition which is capable of forming an internal box of a refrigerator having good physical properties, easy vacuum formability, and excellent freon resistance, especially excellent resistance to HCFC 141b.

These and additional objects can be achieved by the resin compositions according to the present invention.

SUMMARY OF THE INVENTION

In accordance with the present invention, the resin composition for preparing an internal box of a refrigerator comprises (A) a graft polymer obtained by grafting in emulsion polymerization 100 parts by weight of a monomer mixture comprising about 20–about 30% by weight of a vinyl cyanide compound and about 80–about 70% by weight of an aromatic vinyl compound to about 20–about 60 parts by weight of a conjugated diene rubber, (B) a graft polymer obtained by grafting in emulsion polymerization 100 parts by weight of a monomer mixture comprising about 20–about 30% by weight of a vinyl cyanide compound and about 80–about 70% by weight of an aromatic vinyl compound to about 20–about 60 parts by weight of an acrylic rubber, (C) a copolymer obtained by polymerizing a monomer mixture comprising about 40–about 50% by weight of a vinyl cyanide compound and about 60–about 50% by weight of an aromatic vinyl compound, and (D) a copolymer obtained by polymerizing a monomer mixture comprising about 30–about 35% by weight of a vinyl cyanide compound and about 70–about 65% by weight of an aromatic vinyl compound, wherein the ratio by weight of (A)+(B) to (C)+(D) is from 50:50 to 20:80, the ratio by weight of (A) to (B) is from 10:1 to 1:1, and the ratio by weight of (C) to (D) is from 10:1 to 5:2.

The thermoplastic resin composition according to the present invention may be preferably employed in preparing the internal boxes of refrigerators, which are manufactured using HCFC 141b as a foaming agent, due to good physical properties, easy vacuum formability, and excellent freon resistance, especially excellent resistance to HCFC 141b.

DETAILED DESCRIPTION OF THE INVENTION

The resin composition for preparing an internal box of a refrigerator according to the present invention comprises (A)

a graft polymer obtained by grafting of a monomer mixture comprising a vinyl cyanide compound and an aromatic vinyl compound to a conjugated diene rubber, (B) a graft polymer obtained by grafting a monomer mixture comprising a vinyl cyanide compound and an aromatic vinyl compound to an acrylic rubber, (C) a copolymer of about 40~about 50% by weight of a vinyl cyanide compound and about 60~about 50% by weight of an aromatic vinyl compound, and (D) a copolymer of about 30~about 35% by weight of a vinyl cyanide compound and about 70~about 65% by weight of an aromatic vinyl compound. The components (A), (B), (C) and (D) will be described in detail hereinafter.

(A) Graft Polymer of Vinyl Cyanide Compound and Aromatic Vinyl Compound to Conjugated Diene Rubber The graft polymer is prepared by mixing 100 parts by weight of a monomer mixture of a vinyl cyanide compound and an aromatic vinyl compound and 20~60 parts (on the basis of solids content) by weight of a conjugated diene rubber, and by grafting in a conventional emulsion polymerization the monomer mixture to the conjugated diene rubber. The monomer mixture contains about 20~about 30% by weight of a vinyl cyanide compound and about 80~about 70% by weight of an aromatic vinyl compound. As known in the art, the monomer mixture exists as a polymer matrix of vinyl cyanide monomers and aromatic vinyl monomers. The polymer matrix for preparing the graft polymer (A) contains 20–30% by weight of the vinyl cyanide compound. Most of the polymer matrix are grafted onto the conjugated diene rubber.

In this invention, the graft ratio of grafting the polymer matrix onto the conjugated diene rubber would be preferably 40–70% based upon the weight of the diene rubber.

The conjugated diene rubber to be used for the preparation of the graft polymer (A) includes polybutadiene, polyisoprene, polychloroprene, a butadiene-styrene copolymer, and a butadiene-acrylonitrile copolymer. Among them, polybutadiene, a butadiene-styrene copolymer, and a butadiene-acrylonitrile copolymer may be preferably used. The average rubber particle size of the conjugated diene rubber is preferably in the range of 0.1~0.6 μm, more preferably 0.2~0.5 μm. The average rubber particle size of a conjugated diene rubber affects directly impact strength and glossy appearance of a resin composition. If the average rubber particle size is less than 0.1 μm, the resin composition cannot provide a sufficient impact strength. On the other hand, if the average rubber particle size exceeds 0.6 μm, the glossy appearance is deteriorated. Therefore, the average rubber particle size of the conjugated diene rubber should be in the range of 0.1~0.6 μm.

The monomer mixture for preparing the graft polymer (A) exists as a polymer matrix of vinyl cyanide monomers and aromatic vinyl monomers. The polymer matrix is grafted onto the conjugated diene rubber, and the grafted content of the polymer matrix affects physical properties of the final resin composition such as impact strength and tensile strength, and chemical properties such as freon resistance. In this invention, the graft ratio of grafting the polymer matrix onto the conjugated diene rubber would be preferably 40~70% based upon the weight of the diene rubber. In order to obtain the well balanced physical and chemical properties of the final products, the monomer mixture should contain 20~30% by weight of a vinyl cyanide compound. If the monomer mixture contains less than 20% by weight of a vinyl cyanide compound, the final resin composition provides a poor impact strength because the graft polymer (A) has an insufficient compatibility with a copolymer (C) and a copolymer (D) which will be described hereinafter. On the other hand, if the monomer mixture contains more than 30% by weight of a vinyl cyanide compound, the final resin composition shows a color change phenomenon during an extrusion process, although a freon resistance of the resin composition improves.

Specific examples of the vinyl cyanide compound for preparing the graft polymer (A) are acrylonitrile, methacrylonitrile and the like. These vinyl cyanide compounds can be used alone or in combination.

Specific examples of the aromatic vinyl compound for preparing the graft polymer (A) are styrene, alpha-methylstyrene, para-methylstyrene, vinylxylene, monochlorostyrene, dichlorostyrene and vinylnaphthalene, styrene of which is the most preferable. These aromatic vinyl compounds can be used alone or in combination.

(B) Graft Polymer of Vinyl Cyanide Compound and Aromatic Vinyl Compound to Acrylic Rubber The graft polymer (B) is prepared by mixing 100 parts by weight of a monomer mixture of a vinyl cyanide compound and an aromatic vinyl compound and 20~60 parts (on the basis of solids content) by weight of an acrylic rubber, and by grafting in a conventional emulsion polymerization the monomer mixture to the acrylic rubber. The monomer mixture comprises about 20~about 30% by weight of a vinyl cyanide compound and about 80~about 70% by weight of an aromatic vinyl compound. The monomer mixture exists as a polymer matrix of vinyl cyanide monomers and aromatic vinyl monomers. The polymer matrix for preparing the graft polymer (B) contains 20~30% by weight of the vinyl cyanide compound. The polymer matrix is grafted onto the acrylic rubber. In this invention, the graft ratio of grafting the polymer matrix onto the acrylic rubber would be preferably 40~70% based upon the total weight of the acrylic rubber.

The acrylic rubber to be used for the preparation of the graft polymer (B) is prepared by emulsion polymerization of alkyl acrylate monomers having 2–8 carbon atoms. A graft polymer of grafting a vinyl cyanide compound and an aromatic vinyl compound to an acrylic rubber has a strong resistance HCFC 141b.

The average rubber particle size of the acrylic rubber is preferably in the range of 0.05~0.5 μm, more preferably 0.1~0.3 μm. In order to provide a resin composition with excellent impact strength, the average particle size of the acrylic rubber should be smaller than that of the conjugated diene rubber. The larger the particle size of the acrylic rubber is, the lower stability of polymerization is.

The vinyl cyanide compound and the aromatic vinyl compound for preparing the graft polymer (B) are the same as described above for preparing the graft polymer (A).

(C) Copolymer of 38~45% of Vinyl Cyanide Compound and 62~55% of Aromatic Vinyl Compound The copolymer (C) having 38~45% by weight of a vinyl cyanide compound on the basis of the weight of the copolymer is prepared by copolymerizing 40~50% of a vinyl cyanide compound and 60~50% of an aromatic vinyl compound. The weight average molecular weight of the copolymer is preferably in the range of 100,000~200,000, and the molecular weight distribution (weight average molecular weight/number average molecular weight) is preferably in 1.8~2.5.

In regard to the copolymer (C), the content of the vinyl cyanide compound affects a freon resistance, and the molecular weight and molecular distribution of the copolymer affect physical properties of the resin composition and a sheet forming processability. If the copolymer contains a vinyl cyanide compound less than 38% by weight, the final resin composition gives a stress crack on a molded article because of a poor resistance to HCFC 141b. On the other hand, if the copolymer contains a vinyl cyanide compound more than 45% by weight, a over-load is applied during an extrusion process and a color change occurs. And, if the weight average molecular weight of the copolymer is less than 100,000, physical properties such as tensile strength and impact strength are reduced and the resin composition is not suitable for preparing a sheet for internal boxes of a refrigerator. If the weight average molecular weight of the copolymer exceeds 200,000, a color change occurs during an extrusion process and there is a difficulty in an extrusion process into a sheet due to a poor fluidity.

The vinyl cyanide compound and the aromatic vinyl compound for preparing the copolymer (C) are the same as described above for preparing the graft polymer (A).

(D) Copolymer of 28~35% of Vinyl Cyanide Compound and 72~65% of Aromatic Vinyl Compound The copolymer (D) having 28~35% by weight of a vinyl cyanide compound on the basis of the weight of the copolymer is prepared by copolymerizing copolymerizing 30~35% of a vinyl cyanide compound and 70~65% of an aromatic vinyl compound. The weight average molecular weight of the copolymer is preferably in the range of 150,000~250,000, and the molecular distribution (weight average molecular weight/number average molecular weight) is preferably in 1.8~2.5.

The vinyl cyanide compound and the aromatic vinyl compound for preparing the copolymer (D) are the same as described above for preparing the graft polymer (A).

A thermoplastic resin composition consisting of the graft polymer (A), the graft polymer (B) and the copolymer (C) only is resistant enough to HCHC 141b, but reduces impact strength, tensile strength, fluidity and vacuum formability. It is believed that the impact strength is reduced due to a poor compatibility of the graft polymer (A) with the copolymer (C), the tensile strength is reduced due to a low molecular weight, the fluidity is decreased due to a higher content of a vinyl cyanide compound, and the vacuum formability is poor due to a narrow molecular weight distribution of the copolymer. For improving the poor physical properties above, a copolymer having a less content of a vinyl cyanide compound and a higher molecular weight is added in this invention. As the copolymer (D) has a less content of a vinyl cyanide compound than the copolymer (C), the compatibility of the graft polymer (A) with the copolymer (C) improves and a decrease of the impact strength of the resin composition can be prevented, and as the copolymer (D) has a higher molecular weight than the polymer (C), the tensile strength and vacuum formability improve.

The ratio by weight of (A)+(B) to (C)+(D) is from 50:50 to 20:80. This ratio has an important role in providing a good balance of physical properties such as impact strength and tensile strength of the resin composition. In case that the weight of (A)+(B) exceeds 50% by weight per the total weight of the resin composition, the tensile strength is reduced, on the other hand, if the weight is less than 20%, the impact strength is reduced, accordingly, the resin composition is not suitable for sheets for internal boxes.

The ratio by weight of the graft polymer (A) to the graft polymer (B) is from 10:1 to 1:1. It is believed that this ratio affects a freon resistance and an impact strength. Generally, the graft polymer (B) is more resistant to HCFC 141b than the graft polymer (A), because an acrylic rubber is employed in the graft polymer (B), while the graft polymer (B) has a poorer impact strength than the graft polymer (A). Considering the both properties, the ratio by weight of the graft polymer (A) to the graft polymer (B) should be from 10:1 to 1:1.

The ratio by weight of the copolymer (C) to the copolymer (D) is from 10:1 to 5:2. It is believed that this ratio affects a freon resistance, an impact strength, fluidity and vacuum formability. If the copolymer (C) is employed in a more amount than the above, the impact strength and vacuum formability of the resin composition become poor, and if the copolymer (C) is employed in a less amount, a freon resistance is not good.

The invention may be better understood by reference to the following examples which are intended for the purpose of illustration and are not to be construed as in any way limiting the scope of the present invention, which is defined in the claims appended hereto.

EXAMPLES

For preparing resin compositions according to this invention, each component of (A), (B), (C) and (D) was prepared as follow:

Preparation of Graft Polymer (A)

Polybutadiene latex of 45 parts as a solids content, having average rubber particle size of 0.3 µm, and deionized water of 200 parts were charged into a reactor having an agitator, a reflux cooling system, a thermostat and an feeding apparatus for additives. The mixture was agitated under a flow of nitrogen gas. During the agitation, 4% aqueous potassium perchlorate solution of 7 g and monomer mixture consisting of styrene of 70 parts and acrylonitrile of 30 parts were added. The resulting mixture was polymerized at 70° C. adding continuously tert-dodecyl mercaptan of 0.1 parts over three hours and a rubber latex was obtained. The latex was dropped into an aqueous sulfuric acid solution heated at 90° C., and a precipitating material was obtained. The precipitating material was washed, dehydrated and dried, and the graft polymer (A) was obtained. The graft ratio of the polymer was 50%, and the acrylonitrile content was 28% by weight per the total weight of the polymer except rubber content.

Preparation of Acrylic Rubber

Butyl acrylate of 49 parts, triarylisocyanate of 0.5 parts, potassium rosin of 2.0 parts and deionized water of 90 parts were charged into a reactor. The mixture was agitated at 45° C. for 40 minutes and was heated to 70° C. Potassium persulfate of 0.17 parts was added to the mixture. When the polymerization rate of the mixture reached to 60%, to the mixture was added continuously over two hours a mixture which had been prepared with butyl acrylate of 49.5 parts, triarylisocyanate of 1.0 parts, potassium rosin of 0.5 parts and deionized water of 30 parts in a pre-emulsion state. When the polymerization rate of the mixture reached to 87%, potassium persulfate of 0.07 parts was added to the mixture and the polymerization was carried out at 70° C. The acrylic rubber latex having a polymerization of 98.3% was obtained.

Preparation of Graft Polymer (B)

The prepared acrylic rubber latex of 50 parts as a solids content, acrylonitrile of 6.25 parts, styrene of 18.75 parts and deionized water of 110 parts were charged into a reactor. The mixture was agitated at 45° C. over 50 minutes. To the mixture were added potassium rosin of 0.45 parts, cumene hydroperoxide of 0.15 parts and tert-dodecyl mercaptan of 0.08 parts and the temperature was raised to 67° C. Then, polymerization was started by adding disodium ethylene diamine tetraacetate of 0.12 parts, sodium formaldehyde sulfoncylate of 0.25 parts and ferrous sulfate of 0.005 parts to the mixture. The polymerization at 67° C. was performed for four hours. When the polymerization rate of the mixture reached to 70%, to the mixture was added continuously over three hours a mixture which had been prepared with acrylonitrile of 6.25 parts, styrene of 18.75. parts, potassium rosin of 0.8 parts, tert-dodecyl mercaptan of 0.1 parts, cumene hydroperoxide of 0.15 parts and deionized water of 40 parts in a pre-emulsion state. The temperature was kept at 78° C. and the polymerization was performed for one hour.

Preparation of Copolymer (C)

Deionized water of 160 parts and potassium oleate of 3 parts was charged into a nitrogen-substituted reactor. A first monomer mixture of styrene 20.2 parts and acrylonitrile 19.8 parts, and tert-dodecyl mercaptan of 0.25 parts were added into the reactor and emulsified. The mixture in the reactor was agitated raising the temperature to 60° C. To the mixture was added potassium persulfate of 0.3 parts and polymerization was performed over 65° C. After polymerizing the first monomer mixture for thirty minutes, a second monomer mixture of styrene 32.8 parts and acrylonitrile 27.2 parts was added over five hours, and the copolymer (C) was obtained. Acrylonitrile content was 40% by weight per the polymer prepared, weight average molecular weight was 140,000, and number average molecular weight was 68,000.

Preparation of Copolymer (D)

Deionized water of 160 parts and potassium oleate of 3 parts was charged into a nitrogen-substituted reactor. A first monomer mixture of styrene 23.2 parts and acrylonitrile 16.8 parts, and tert-dodecyl mercaptan of 0.2 parts were added into the reactor and emulsified. The mixture in the reactor was agitated raising the temperature to 60° C. To the mixture was added potassium persulfate of 0.3 parts and polymerization was performed over 65° C. After polymerizing the first monomer mixture for thirty minutes, a second monomer mixture of styrene 36.8 parts and acrylonitrile 23.2 parts was added over five hours, and the copolymer (C) was obtained. Acrylonitrile content was 33% by weight per the polymer prepared, weight average molecular weight was 210,000, and number average molecular weight was 96,000.

Example 1

Using a tumbler mixer, the graft polymer (A) of 20 parts, the graft polymer (B) of 10 parts, the copolymer (C) of 60 parts and the copolymer (D) of 10 parts were premixed adding an anti-oxidant of 0.2 parts and a lubricating agent of 0.4 parts for ten minutes. The mixture was extruded into pellets with a 45 θtwin screw extruder. The cylinder temperature of the extruder was kept at 220° C. and the screw was adjusted in 300 rpm. Test specimens for physical properties were prepared. Test specimens for a freon resistance were prepared in a size of 30×150×2 mm by compression molding. For preparing the test specimens for a freon resistance, the temperature of a heater was kept at 220° C., the compression time was two minutes, and the preheating time was two minutes.

The composition of the components (A), (B), (C) and (D) and the test results are shown in Table 1.

Examples 2–6

The procedure in Example 1 was carried out except that the contents of the components (A), (B), (C) and (D) were changed. The composition of the components (A), (B), (C) and (D) and the test results are shown in Table 1.

Comparative Examples 1–6

The procedure in Example 1 was carried out except that the contents of the components (A), (B), (C) and (D) were changed, and that a component of them was excluded. The composition of the components (A), (B), (C) and (D) and the test results are shown in Table 1.

Test Methods

For the test specimens prepared according to the examples, physical and chemical properties were measured as follow:

Tensile strength: It was measured according to ASTM D 638.

Impact strength: It was measured according to ASTM D 256.

Yellow index: It was measured according to ASTM D 1925.

Melt index: It was measured according to ASTM D 1238.

Freon resistance: A test specimen of 30×150×2 mm was fixed to a ¼ ellipsoidal jig with an equation of $5X^2 + 24Y^2 = 1$. HCFC 141b of 100 ml was added into a 5 l desiccator. Freon resistance was measured after keeping the test specimen at 30° C. for 8 hours.

TABLE 1

| | Examples | | | | | | | | | | | | |
|---|---|---|---|---|---|---|---|---|---|---|---|---|---|
| | 1 | 2 | 1* | 3 | 2* | 4 | 3* | 5 | 4* | 6 | 5* | 7 | 6* |
| Compositions | | | | | | | | | | | | | |
| graft polymer (A) | 20 | 15 | 10 | 27 | 30 | 20 | 20 | 20 | 20 | 30 | 40 | 15 | 10 |
| graft polymer (B) | 10 | 15 | 20 | 3 | 0 | 10 | 10 | 10 | 10 | 15 | 20 | 7 | 5 |
| copolymer (C) | 60 | 60 | 60 | 60 | 60 | 50 | 40 | 55 | 70 | 47 | 34 | 66 | 73 |
| copolymer (D) | 10 | 10 | 10 | 10 | 10 | 20 | 30 | 5 | 0 | 8 | 6 | 11 | 12 |
| Properties | | | | | | | | | | | | | |
| tensile strength | 490 | 492 | 492 | 490 | 493 | 500 | 515 | 495 | 475 | 450 | 390 | 550 | 600 |
| impact strength | 32 | 28 | 23 | 35 | 37 | 35 | 37 | 34 | 25 | 43 | 45 | 25 | 16 |
| yellow index | 15 | 13 | 10 | 18 | 20 | 12 | 10 | 12 | 20 | 16 | 17 | 15 | 16 |
| freon resistance | 1.5 | 2.0 | 2.0 | 1.3 | 0.5 | 1.3 | 0.7 | 1.2 | 2.0 | 2.0 | 2.0 | 1.4 | 0.4 |
| melt index | 8.0 | 8.2 | 8.5 | 7.7 | 7.5 | 9 | 10 | 9 | 5 | 6 | 5 | 9 | 10 |

*Comparative Examples

As shown in Table 1, Comparative Example 1 shows a low impact strength due to a low ratio of (A):(B) of 1:2, and Comparative Example 2 shows a poor freon resistance due to a use of the graft polymer (A) only. The freon resistance means a critical deformation and should be 1.0 or more. Comparative Example 3 shows a poor freon resistance due to a low ratio of (C):(D) of 4:3, and Comparative Example 4 shows a high yellow index due to a use of the copolymer (C) only. The yellow index means color of a resin. A resin having a high yellow index is not suitable for an article which requires a white color. Generally, a resin having a yellow index of 20 or more is not suitable for the article. Comparative Example 5 shows a low tensile strength due to a high ratio of (A)+(B):(C)+(D) of 6:4, and Comparative Example 6 shows a poor freon resistance due to a low ratio of (A)+(B):(C)+(D) of 15:85.

The thermoplastic resin compositions according to the present invention have effects of the invention, which are capable of forming an internal box of a refrigerator having good physical properties, easy vacuum formability, and excellent freon resistance, especially excellent resistance to HCFC 141b.

It is apparent from the above that many modifications and changes are possible without departing from the spirit and scope of the present invention.

What is claimed is:

1. A thermoplastic resin composition for preparing an internal box of a refrigerator, which comprises:

(A) a graft polymer obtained by grafting in emulsion polymerization 100 parts by weight of a monomer mixture comprising about 20 to about 30% by weight of a vinyl cyanide compound and about 80 to about 70% by weight of an aromatic vinyl compound to about 20 to about 60 parts by weight of a conjugated diene rubber;

(B) a graft polymer obtained by grafting in emulsion polymerization 100 parts by weight of a monomer mixture comprising about 20 to about 30% by weight of a vinyl cyanide compound and about 80 to about 70% by weight of an aromatic vinyl compound to about 20 to about 60 parts by weight of an acrylic rubber;

(C) a copolymer obtained by polymerizing a monomer mixture comprising about 40 to about 50% by weight of a vinyl cyanide compound and about 60 to about 50% by weight of an aromatic vinyl compound; and (D) a copolymer obtained by polymerizing a monomer mixture comprising about 30 to about 35% by weight of a vinyl cyanide compound and about 70 to about 65% by weight of an aromatic vinyl compound, wherein the ratio by weight of (A)+(B) to (C)+(D) is from 50:50 to 20:80, the ratio by weight of (A) to (B) is from 10:1 to 1:1, and the ratio by weight of (C) to (D) is from 10:1 to 5:2.

2. The resin composition according to claim 1 wherein said graft polymer (A) has a graft ratio of 40–70% of grafting the polymer matrix of vinyl cyanide monomers and aromatic vinyl monomers onto the conjugated diene rubber.

3. The resin composition according to claim 1 wherein said graft polymer (B) has a graft ratio of 40–70% of grafting the polymer matrix of vinyl cyanide monomers and aromatic vinyl monomers onto the acrylic rubber.

4. The resin composition according to claim 1 wherein said vinyl cyanide compound is acrylonitrile or methacrylonitrile.

5. The resin composition according to claim 1 wherein said aromatic vinyl compound is selected from the group consisting of styrene, alpha-methylstyrene, para-methylstyrene, vinyl xylene, monochlorostyrene, dichlorostyrene and vinylnaphthalene.

6. The resin composition according to claim 1 wherein said conjugated diene rubber is selected from the group consisting of polybutadiene, polyisoprene, polychloroprene, a butadiene-styrene copolymer, and a butadiene-acrylonitrile copolymer.

7. The resin composition according to claim 6 wherein said conjugated diene rubber has an average rubber particle size of 0.1–0.6 μm.

8. The resin composition according to claim 1 wherein said acrylic rubber is made from an alkyl acrylate monomer having 2–8 carbon atoms.

9. The resin composition according to claim 1 wherein said acrylic rubber has an average rubber particle size of 0.05–0.5 μm.

10. The resin composition according to claim 1 wherein said copolymer (C) has about 38 to about 45% by weight of a vinyl cyanide compound, a weight average molecular weight of 100,000–200,000, and a molecular weight distribution of 1.8–2.5.

11. The resin composition according to claim 1 wherein said copolymer (D) has 28–35% by weight of a vinyl cyanide compound, a weight average molecular weight of 150,000–250,000, and a molecular weight distribution of 1.8–2.5.

12. A thermoplastic resin composition according to claim 1 wherein the monomer mixture of (A) consists essentially of about 20 to about 30% by weight of a vinyl cyanide compound and about 80 to about 70% by weigh of an aromatic vinyl compound, the monomer mixture of (B) consists essentially of about 20 to about 30% by weight of a vinyl cyanide compound and about 80 to about 70% by weight of an aromatic vinyl compound to about 20 to about 60 parts by weight of an acrylic rubber; the monomer mixture of (C) consists essentially of about 40 to about 50% by weight of a vinyl cyanide compound and about 60 to about 50% by weight of an aromatic vinyl compound; and the monomer mixture of (D) consists essentially of about 30 to about 35% by weight of a vinyl cyanide compound and about 70 to about 65% by weight of an aromatic vinyl compound.

13. The resin composition according to claim 10 wherein said copolymer (D) has 28–35% by weight of a vinyl cyanide compound, a weight average molecular weight of 150,000–250,000, and a molecular weight distribution of 1.8–2.5.

14. A method of making of an internal box of a refrigerator using the composition of claim 1.

* * * * *

UNITED STATES PATENT AND TRADEMARK OFFICE
CERTIFICATE OF CORRECTION

PATENT NO. : 5,747,587'
DATED : May 5, 1998
INVENTOR(S) : Sung-kook Kim and Jin-whan Choi It is certified that error appears in the above-indentified patent and that said Letters Patent is hereby corrected as shown below:

In Table 1 that appears below column 8, the value for Example 5, copolymer (D) is "5" and should read --15--; the value for Example 7, copolymer (D) is "11" and should read --12--.

Signed and Sealed this

Eleventh Day of August 1998

Attest:

BRUCE LEHMAN

Attesting Officer

Commissioner of Patents and Trademarks